United States Patent
Lee et al.

(10) Patent No.: US 11,123,633 B2
(45) Date of Patent: Sep. 21, 2021

(54) METHOD AND APPARATUS FOR CONTROLLING GAME

(71) Applicant: NCSOFT Corporation, Seoul (KR)

(72) Inventors: Yun Suk Lee, Seongnam-si (KR); Pyung Ki Son, Seongnam-si (KR); Sang Hee Kim, Seongnam-si (KR); Tae Jun Kim, Seongnam-si (KR); Chang Hwan An, Seongnam-si (KR); Hye Rim Kim, Seongnam-si (KR)

(73) Assignee: NCSOFT Corporation, Seoul (KR)

( * ) Notice: Subject to any disclaimer, the term of this patent is extended or adjusted under 35 U.S.C. 154(b) by 75 days.

(21) Appl. No.: 16/662,202

(22) Filed: Oct. 24, 2019

(65) Prior Publication Data

US 2020/0254339 A1    Aug. 13, 2020

(30) Foreign Application Priority Data

Feb. 7, 2019    (KR) .................. 10-2019-0014215

(51) Int. Cl.
*A63F 13/31* (2014.01)
*A63F 13/426* (2014.01)
*A63F 13/52* (2014.01)
*H04L 29/06* (2006.01)

(52) U.S. Cl.
CPC ............ *A63F 13/31* (2014.09); *A63F 13/426* (2014.09); *A63F 13/52* (2014.09); *H04L 67/38* (2013.01); *A63F 2300/40* (2013.01)

(58) Field of Classification Search
None
See application file for complete search history.

(56) References Cited

U.S. PATENT DOCUMENTS

2012/0004040 A1    1/2012    Pereira et al.
2016/0225224 A1    8/2016    Nguyen et al.
2017/0252647 A1    9/2017    Perry et al.
(Continued)

FOREIGN PATENT DOCUMENTS

CN        103023872 B    1/2016
TW        201219093 A    5/2012
TW        201303706 A    1/2013
(Continued)

OTHER PUBLICATIONS

Rich Edmonds, "Steam tips and tricks for new PC gamers," May 23, 2017, https://www.windowscentral.com/how-get-started-and-play-pc-games-steam (Year: 2017).*
(Continued)

*Primary Examiner* — Kevin Y Kim
(74) *Attorney, Agent, or Firm* — Sughrue Mion, PLLC

(57) ABSTRACT

A method and apparatus for controlling a game are provided. The method for controlling a game according to one embodiment includes receiving state information of one or more applications installed in a first user terminal from the first user terminal, displaying a selection screen to receive a user's selection of a target application to be controlled from among the one or more applications, and transmitting control information for controlling a state of the target application selected by the user from among the one or more applications through the selection screen to the first user terminal based on the state information.

20 Claims, 10 Drawing Sheets

(56) References Cited

U.S. PATENT DOCUMENTS

2018/0104587 A1  4/2018  Zachwieja et al.
2018/0310149 A1  10/2018  Lee et al.

FOREIGN PATENT DOCUMENTS

| TW | M449618 U | 4/2013 |
| TW | 201510852 A | 3/2015 |
| TW | 201839621 A | 11/2018 |

OTHER PUBLICATIONS

Chris Hoffman, "How to Use Steam In-Home Streaming," Jul. 10, 2017, https://www.howtogeek.com/189601/how-to-use-steam-in-home-streaming/ (Year: 2017).*

Whitson Gordon, "How to get Better Performance from Steam In-Home Streaming," Jul. 12, 2017, https://www.howtogeek.com/267497/how-to-get-better-performance-from-steam-in-home-streaming/ (Year: 2017).*

Noreen T.M., "Announcing Clips," May 26, 2016, https://blog.twitch.tv/en/2016/05/26/announcing-clips-f8ade2113ddf/ (Year: 2016).*

Katsuaki Kato et al. "Radeon Software has greatly evolved to support remote play such as VR!", AMD Link to remotely play PC games on your smartphone, Jan. 21, 2019, Https://ascii.jp/elem/000/001/790/1790938/index-5.html, ASCII, (11 pages total).

Yukiko Sato, "Version 3.5 update that enables remote play of PS4 PC/Mac, implemented on Apr. 6", IT media News, Apr. 6, 2016, https://www.itmedia.com.jp/news/articles/1604/06/news072.html, (7 pages total).

Communication dated Oct. 7, 2020, from the Taiwanese Intellectual Property Office in application No. 10920967350.

Communication dated Nov. 17, 2020, from the Japanese patent Office in application No. 2019-192769.

Extended European Search Report dated May 4, 2020, issued by the European Patent Office in Application No. 19204994.8.

* cited by examiner

METHOD AND APPARATUS FOR CONTROLLING GAME

CROSS-REFERENCE TO RELATED APPLICATION(S)

This application claims the benefit under 35 USC § 119(a) of Korean Patent Application No. 10-2019-0014215, filed on Feb. 7, 2019, in the Korean Intellectual Property Office, the entire disclosure of which is incorporated herein by reference for all purposes.

BACKGROUND

1. Field

The following description relates to a method and apparatus for controlling a game.

2. Description of Related Art

A role-playing game is a computer game in which each game user assumes a role of a character in a game program and acts out the role. A role-playing game player solves various quests while exploring an adventurous, fictional world according to the rules set by a game manager, thereby being able to feel interested as if he/she became a main protagonist in the game.

An online game is a computer game implemented to run on a wired or wireless network. An online game player can play a game with other people in remote locations through the wired or wireless network.

Particularly, a massively multiplayer online role playing game (MMORPG) type games in which multiple users participate simultaneously to perform various quests in a game map implemented in a virtual space are gaining popularity.

In the process of playing the game, it often happens that a user should move to a specific position in the game or take a particular action in the game. At this time, the acquisition of a user input regarding the position to which a character needs to move or the particular action to be taken by the character may be implemented using various user input acquisition techniques.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The disclosed embodiments are intended to provide a method for controlling a game including receiving state information of one or more applications installed in a first user terminal from the first user terminal, displaying a selection screen to receive a user's selection of a target application to be controlled from among the one or more applications, and transmitting control information for controlling a state of the target application selected by the user from among the one or more applications through the selection screen to the first user terminal based on the state information.

The transmitting to the first user terminal may include transmitting control information for controlling at least one of an execution state of the selected target application and transmission of an execution screen of the selected target application to the first user terminal.

The state information may include information regarding an execution state of each of the one or more applications and the control information may include at least one of information for controlling the target application to be executed in the first user terminal, information for enabling an execution state of the target application to be switched to foreground execution state in the first user terminal, and information for enabling at least one of a size, position, display mode, and arrangement order of an execution screen of the target application to be changed in the first user terminal.

The control information may include information for controlling a streaming transmission quality for an execution screen of the target application.

The method may further include receiving streaming data for an execution screen of the target application from the first user terminal, reproducing the execution screen of the target application using the streaming data, and in response to a user input for the reproduced execution screen being detected, providing input information regarding the user input to the first user terminal.

The method may further include receiving, from the first user terminal, event information which includes at least one of event occurrence information of an event of interest that occurs during execution of the target application and a video related to the event of interest and providing a user interface which allows the user to check the event information.

In another general aspect, there is provided a method for controlling a game including providing state information of one or more applications installed in a first user terminal to a second user terminal, receiving control information for controlling a state of a target application among the one or more applications from the second user terminal, and controlling the state of the target application based on the control information.

The receiving of the control information may include receiving control information for controlling at least one of an execution state of the target application and transmission of an execution screen of the selected target application and the controlling of the state of the target application may include controlling at least one of the execution state of the target application and the transmission of the execution screen of the selected target application based on the control information.

The state information may include information regarding an execution state of each of the one or more applications and the control information may include at least one of information for controlling the target application to be executed in the first user terminal, information for enabling an execution state of the target application to be switched to foreground execution state in the first user terminal, and information for enabling at least one of a size, position, display mode, and arrangement order of an execution screen of the target application to be changed in the first user terminal.

The control information may include information for controlling a streaming transmission quality for an execution screen of the target application.

The method may further include transmitting streaming data for an execution screen of the target application to the second user terminal, receiving, from the second user terminal, input information regarding the execution screen of the target application reproduced on the second user terminal using the transmitted streaming data, and controlling an operation corresponding to the input information to be executed in the target application.

The method may further include determining whether an event of interest occurs in the target application, and in response to the event of interest occurring, transmitting event information which includes at least one of event occurrence information of the event of interest and a video related to the event of interest to at least one of the second user terminal and an event sharing server.

In still another general aspect, there is provided an apparatus including a communication interface and at least one processor, wherein the at least one processor is configured to provide state information of one or more applications installed in a first user terminal to a second user terminal through the communication interface, receive control information for controlling a state of a target application among the one or more applications from the second user terminal through the communication interface, and control the state of the target application based on the control information.

The at least one processor may be further configured to receive control information for controlling at least one of an execution state of the target application and transmission of an execution screen of the selected target application and control at least one of the execution state of the target application and the transmission of the execution screen of the selected target application based on the control information.

The state information may include information regarding an execution state of each of the one or more applications and the control information may include at least one of information for controlling the target application to be executed in the first user terminal, information for enabling an execution state of the target application to be switched to foreground execution state in the first user terminal, and information for enabling at least one of a size, position, display mode, and arrangement order of an execution screen of the target application to be changed in the first user terminal.

The control information may include information for controlling a streaming transmission quality for an execution screen of the target application.

The at least one processor may be further configured to transmit streaming data for an execution screen of the target application to the second user terminal through the communication interface, receive input information regarding the execution screen of the target application reproduced on the second user terminal using the transmitted streaming data from the second user terminal through the communication interface, and control an operation corresponding to the input information to be executed in the target application.

The at least one processor may be further configured to determine whether an event of interest occurs in the target application, and in response to the event of interest occurring, transmit event information which includes at least one of event occurrence information of the event of interest and a video related to the event of interest to at least one of the second user terminal and an event sharing server.

Other features and aspects will be apparent from the following detailed description, the drawings, and the claims.

Figure 1:
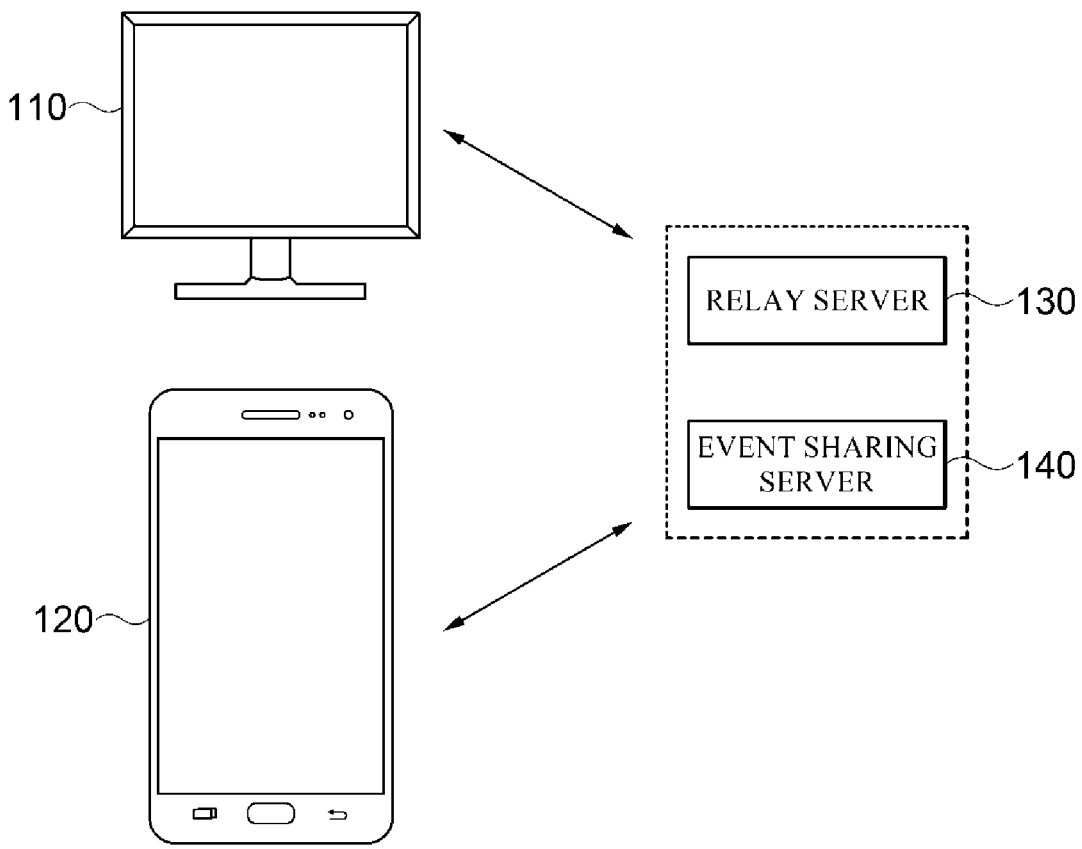
FIG. 1 is a diagram illustrating a configuration of a game control system according to one embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

The term "game" as used herein will be understood to mean software that one or more gamers can enjoy using an input device mounted in or connected to a gaming device. Generally, the game proceeds by the gamers manually maneuver a player character or manipulating a movement of an in-game object. The game may be classified into various genres, such as role playing game (RPG), massive multiplayer online role playing game (MMORPG), adventure, arcade, and the like.

The term "gaming device" as used herein will be understood to mean hardware that executes game software, performs a calculation according to an input of a user through an input device, and outputs a result through an output device. For example, the gaming device may be in the form of a personal computer (PC), a laptop computer, a game console, a smartphone, a tablet PC, or a wearable device, such as a smart band or a smart watch. In addition, any types of hardware that satisfy the above definition may be construed to be the gaming device.

The term "online game" as used herein will be understood to mean a game that is played via a network. Generally, the online game means a game that can be played by connecting two or more gaming devices in remote locations via a network or synchronizing the two or more gaming devices via a server. The form of the gaming device that executes a game is not limited as long as the above definition is satisfied. Not only games executed in a PC or a game console, but also games executed in mobile devices, such as smartphones, or games executed on cloud or executed by interlocking multiple, different gaming devices (including different types of gaming devices) may be construed to be included in the online game as long as the above definition is satisfied.

The term "input device" as used herein will be understood to mean a device for inputting data to a gaming device. For example, the input device may be an input device dedicated for operation of a game and manufactured in the form of a joystick, a mouse, a keyboard, a touch screen, a hardware button, a steering wheel, an instrument, a gun, a glove, a footplate, or the like. In addition, examples of the input device may include various sensors (e.g., a temperature sensor, an infrared sensor, a motion sensor, a gyro sensor, an acceleration sensor, a gravity sensor, etc.) mounted in or interlocked with the gaming device and positioning devices, such as a global positioning system (GPS), an indoor positioning system.

FIG. 1 is a diagram illustrating a configuration of a game control system 100 according to one embodiment.

Referring to FIG. 1, the game control system 100 includes a first user terminal 110, a second user terminal 120, a relay server 130, and an event sharing server 140.

The first user terminal 110 is a device having one or more applications installed therein.

Here, according to one embodiment, the one or more applications installed in the first user terminal 110 may be game applications each of which provides a different game, and in this case, the first user terminal 100 may be the aforementioned gaming device.

Also, the game may be an on-line game provided in conjunction with a game server (not shown), but is not necessarily limited thereto. In some embodiments, the game may be an offline game that is provided without a connection to the game server.

Hereinafter, a description will be given of a case where the one or more applications installed in the first user terminal 110 are game applications, but the application is not necessarily limited thereto.

According to one embodiment, a launcher application for controlling execution of the one or more game applications installed in the first user terminal 110 and supporting streaming play of the one or more game applications installed in the first user terminal 110 in conjunction with a streaming play application installed in the second user terminal 120 may be installed in the first user terminal 110.

The second user terminal 120 is a device used for streaming play of the one or more game applications installed in the first user terminal 110.

The second user terminal 120 may be a mobile device carried by a user, for example, a smartphone, a tablet personal computer (PC), and the like, but is not necessarily limited thereto.

The second user terminal 120 may be a device used by the same user as the first user terminal 110. However, according to embodiments, the user of the first user terminal 110 and the user of the second user terminal 120 may be different from each other.

According to one embodiment, a streaming play application for providing streaming play of the one or more game applications installed in the first user terminal 110 may be installed in the second user terminal 120.

The relay server 130 is a server for relaying data between the first user terminal 110 and the second user terminal 120. Specifically, the launcher application installed in the first user terminal 110 and the streaming play application installed in the second user terminal 120 may transmit and receive data therebetween through the relay server 130.

The event sharing server 140 is a server configured to receive and store event information regarding an event of interest that occurs during execution of the game application installed in the first user terminal 110 from the first user terminal 110 and provide the stored event information to a plurality of users. In this case, the event information may include at least one of event occurrence information regarding the occurring event of interest and a video related to the event of interest.

The configuration of the game control system 100 shown in FIG. 1 may be changed according to embodiments. For instance, in the example shown in FIG. 1, the first user terminal 110 and the second user terminal 120 are illustrated as transmitting and receiving data therebetween through the relay server 130, but unlike the illustrated example, the first user terminal 110 and the second user terminal 120 may directly transmit and receive data therebetween through a wired or wireless network connected to each other.

Figure 2:
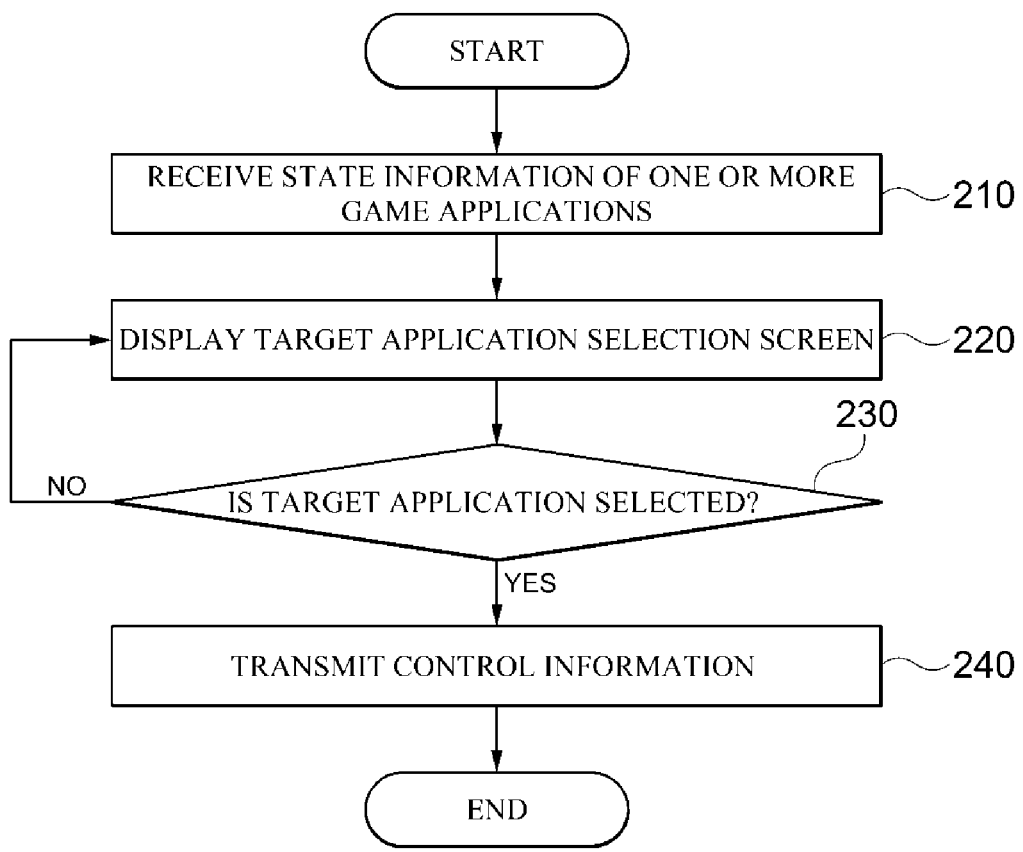
FIG. 2 is a flowchart illustrating a process executed in a second user terminal to control a game application installed in a first user terminal according to one embodiment.

FIG. 2 is a flowchart illustrating a process executed in a second user terminal 120 to control a game application installed in a first user terminal 110 according to one embodiment.

The process shown in FIG. 2 may be performed by, for example, a streaming play application of the second user terminal 120, but is not necessarily limited thereto.

Referring to FIG. 2, the second user terminal 120 receives state information of one or more game applications installed in the first user terminal 110 from the first user terminal 110 (210).

Specifically, according to one embodiment, the second user terminal 120 may issue a request for state information of each of a plurality of preset game applications to the first user terminal 110 and receive the state information of each of the one or more game applications installed in the first user terminal 110 among the plurality of game applications.

According to one embodiment, the state information regarding a game application may include information on an execution state of the game application. In this case, the execution state of the game application may include, for example, information on whether the game application is currently running, information on whether the game application is in foreground execution state or in background execution state, and the like. In this case, the foreground execution state may refer to a state where a game application execution screen is displayed on a display screen of the first user terminal 110. Also, the background execution state may refer to a state where an execution screen is not displayed on the display screen of the first user terminal 110 even when the game application is running after being executed.

In addition, according to one embodiment, the information regarding the execution state of a game application may include, for example, the position, size, display mode (e.g., whole screen mode, window mode, and the like), arrangement order, and the like of the game application execution screen displayed on the display screen of the first user terminal 110.

Then, the second user terminal 120 displays a selection screen on the display screen of the second user terminal 120 to receive a user's selection of a target application to be controlled among one or more game applications whose state information are received from the first user terminal 110 (220).

In this case, the selection screen may include, for example, a list of the one or more game applications whose state information are received and information regarding an execution state of each game application, and the user of the second user terminal 120 may select a target application to be controlled from the list of the game applications included in the selection screen.

Then, when the target application to be controlled is selected through the selection screen (230), the second user terminal 120 transmits control information to the first user terminal 110 to control the state of the target application on the basis of state information of the selected target application to be controlled (240).

In this case, according to one embodiment, the control information may include control information for controlling at least one of the execution state of the selected target application and transmission of the execution screen of the selected target application.

Specifically, according to one embodiment, when the target application to be controlled is not being executed in the first user terminal 110, the second user terminal 120 may transmit control information for enabling the target application to be executed in the first user terminal 110, for example, identification information of the target application, an execution command for the target application, and the like, to the first user terminal 110.

Additionally, according to one embodiment, when the target application to be controlled is being executed in the first user terminal 110, the second user terminal 120 may transmit control information for enabling execution state of the target application to be switched to foreground execution state in the first user terminal 110, for example, identification information of the target application, a foreground execution command for the target application, and the like, to the first user terminal 110.

Furthermore, according to one embodiment, the second user terminal 120 may transmit control information for controlling at least one of the size, position, display mode, and arrangement order of the execution screen of the target application on the display screen of the first user terminal 110 to the first user terminal 110.

For example, where the execution screen of the target application is not displayed in a predetermined size on the first user terminal 110, the second user terminal 120 may transmit is control information for enabling the size of the execution screen of the target application to be changed to the predetermined size to the first user terminal 110.

In another example, where the execution screen of the target application is not displayed at a predetermined position (e.g., the center of the display screen) in the first user terminal 110, the second user terminal 120 may transmit control information for enabling the target application to be moved to the predetermined position to the first user terminal 110.

In still another example, where display mode of the execution screen of the target application in the first user terminal 110 is whole screen mode, the second user terminal 120 may transmit control information for enabling the display mode to be changed to window mode to the first user terminal 110.

In yet another example, where the execution screen of the target application is not displayed at the foremost position on the display screen of the first user terminal 110, the second user terminal 120 may transmit control information for enabling the execution screen of the target application to be displayed at the foremost position on the display screen of the first user terminal 110 to the first user terminal 110.

According to one embodiment, when the target application to be controlled is being executed in the first user terminal 110, the second user terminal 120 may transmit control information to the first user terminal 110 to control transmission of the execution screen of the target application. In this case, the control information may include a transmission request for the execution screen of the target application and information for controlling streaming transmission quality (e.g., a streaming screen resolution) for the execution screen of the target application.

In the flowchart illustrated in FIG. 2, the process is illustrated as being divided into a plurality of operations. However, it should be noted that at least some of the operations may be performed in different order or may be combined into fewer operations or further divided into more operations. In addition, some of the operations may be omitted, or one or more extra operations, which are not illustrated, may be added to the flowchart and be performed.

Figure 3:
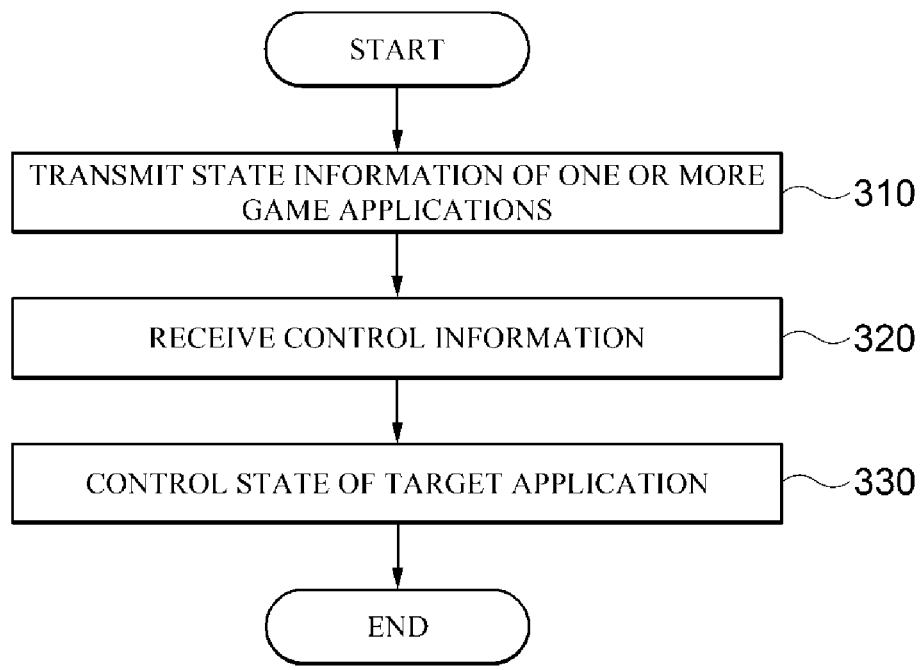
FIG. 3 is a flowchart illustrating a process executed in a first user terminal to control a target application to be controlled according to one embodiment.

FIG. 3 is a flowchart illustrating a process executed in a first user terminal 110 to control a target application to be controlled according to one embodiment.

The process shown in FIG. 3 may be performed by a launcher application installed in the first user terminal 110, but is not necessarily limited thereto.

Referring to FIG. 3, the first user terminal 110 transmits state information regarding one or more game applications installed in the first user terminal 110 to the second user terminal 120 (310).

Specifically, according to one embodiment, the first user terminal 110 may receive in advance a request for transmitting state information of each of a plurality of predetermined game applications from the second user terminal 120. In this case, the first user terminal 110 may identify the one or more game applications installed in the first user terminal 110 among the plurality of game applications and transmit state information of each of the identified applications to the second user terminal 120.

Then, the first user terminal 110 receives control information for controlling a state of a target application to be controlled from the second user terminal 120 (320).

Then, the first user terminal 110 controls the state of the target application among the one or more game applications installed in the first user terminal 110 on the basis of the control information received from the second user terminal 120 (330).

Here, according to one embodiment, the control information received from the second user terminal 120 may include control information for enabling the target application to be executed in the first user terminal 110, for example, identification information of the target application and an execution command for the target application. In this case, the first user terminal 110 may execute the target application to be controlled among one or more game applications installed in the first user terminal 110 on the basis of the received control information.

In addition, according to one embodiment, the control information received from the second user terminal 120 may include control information for enabling the execution state of the target application to be switched to foreground execution state in the first user terminal 110, for example, identification information of the target application, a foreground execution command for the target application, and the like. In this case, the first user terminal 110 may change the execution state of the target application on the basis of the received control information such that the target application can be executed in foreground among the one or more game applications installed in the first user terminal 110.

Also, according to one embodiment, the control information received from the second user terminal 120 may include control information for controlling at least one of, for example, the size, position, display mode, and arrangement order of an execution screen of the target application displayed on the display screen of the first user terminal 110. In this case, the first user terminal 110 may change at least one of the size, position, display mode, and arrangement order of the execution screen of the target application on the basis of the received control information.

For example, where the control information received from the second user terminal 120 includes control information for changing the size of the execution screen of the target application to a predetermined size, the first user terminal 110 may change the size of the execution screen of the target application to the predetermined size on the display screen of the first user terminal 110 on the basis of the received control information.

In another example, where the control information received from the second user terminal 120 includes control information for changing a position of the execution screen of the target application to a predetermined position, the first user terminal 110 may move the execution screen of the target application to the predetermined position on the display screen of the first user terminal 110 on the basis of the received control information.

In still another example, where the control information received from the second user terminal 120 includes control information for changing display mode of the execution screen of the target application (e.g., change from window mode to whole screen mode), the first user terminal 110 may change the display mode of the execution screen of the target application (e.g., from window mode to whole screen mode) on the basis of the received control information.

In yet another example, where the control information received from the second user terminal 120 includes control information for enabling the execution screen of the target application to be displayed at the foremost position on the display screen of the first user terminal 110, the first user terminal 110 may change the arrangement order of the execution screen of the target application on the basis of the received control information such that the execution screen of the target application can be displayed at the foremost position on the display screen of the first user terminal 110.

According to one embodiment, where the control information received from the second user terminal 120 includes control information for controlling, for example, transmission of the execution screen of the target application, the first user terminal 110 may transmit streaming data for the execution screen of the target application to the second user terminal 120 according to the received control information.

For example, the first user terminal 110 may determine a streaming transmission quality according to the control information received from the second user terminal 120 and transmit the streaming data for the execution screen of the target application to the first user terminal 110 according to the determined streaming transmission quality.

In the flowchart illustrated in FIG. 3, the process is illustrated as being divided into a plurality of operations. However, it should be noted that at least some of the operations may be performed in different order or may be combined into fewer operations or further divided into more operations. In addition, some of the operations may be omitted, or one or more extra operations, which are not illustrated, may be added to the flowchart and be performed.

Figure 4:
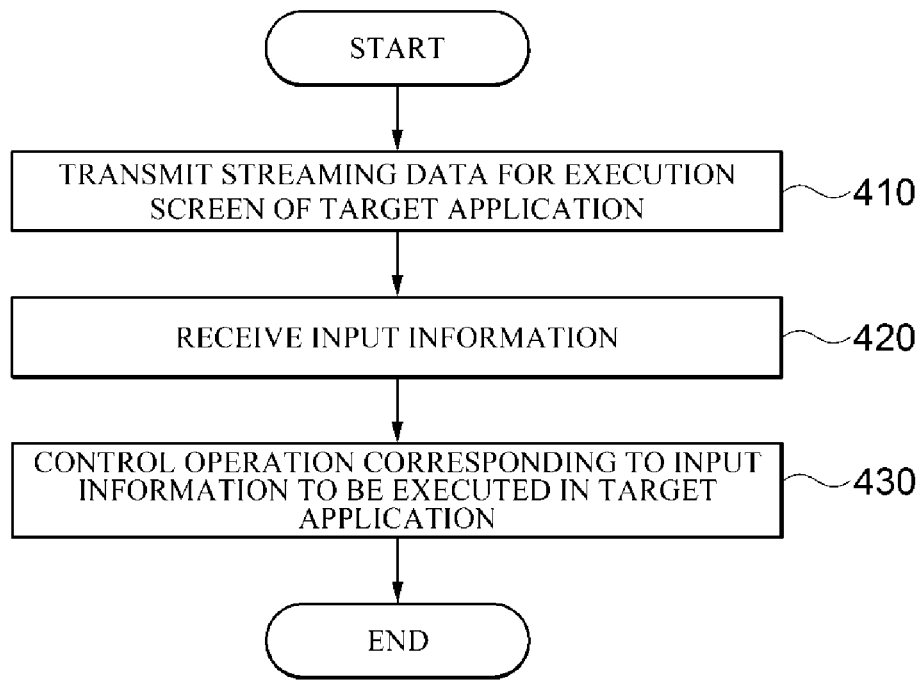
FIG. 4 is a flowchart executed in a first user terminal to control streaming play of a target application according to one embodiment.

FIG. 4 is a flowchart executed in a first user terminal 100 to control streaming play of a target application according to one embodiment.

The process illustrated in FIG. 4 may be performed by a launcher application installed in the first user terminal 110, but is not necessarily limited thereto.

Referring to FIG. 4, the first user terminal 110 transmits streaming data for an execution screen of the target application to be controlled among one or more game applications installed in the first user terminal 110 to a second user terminal 120 (410).

In this case, according to one embodiment, identification of the target application and a transmission quality of the streaming data may be determined according to control information received from the second user terminal 120.

Then, the first user terminal 110 receives, from the second user terminal 120, user input information regarding the execution screen of the target application being reproduced on the second user terminal 120 using the transmitted streaming data (420).

In this case, the input information may include information regarding a type of user input (e.g., touch, drag, click, double-click, gesture type, and the like), a position of the user input, and the like.

Thereafter, the first user terminal 110 controls an operation corresponding to the received input information to be executed in the target application (430).

For example, the first user terminal 110 may control an operation, such as movement of a game character, acquisition of an item, skill change, activation of a menu screen, and the like, to be executed on the execution screen of the target application according to the received input information.

In the flowchart illustrated in FIG. 4, the process is illustrated as being divided into a plurality of operations. However, it should be noted that at least some of the operations may be performed in different order or may be combined into fewer operations or further divided into more operations. In addition, some of the operations may be omitted, or one or more extra operations, which are not illustrated, may be added to the flowchart and be performed.

Figure 5:
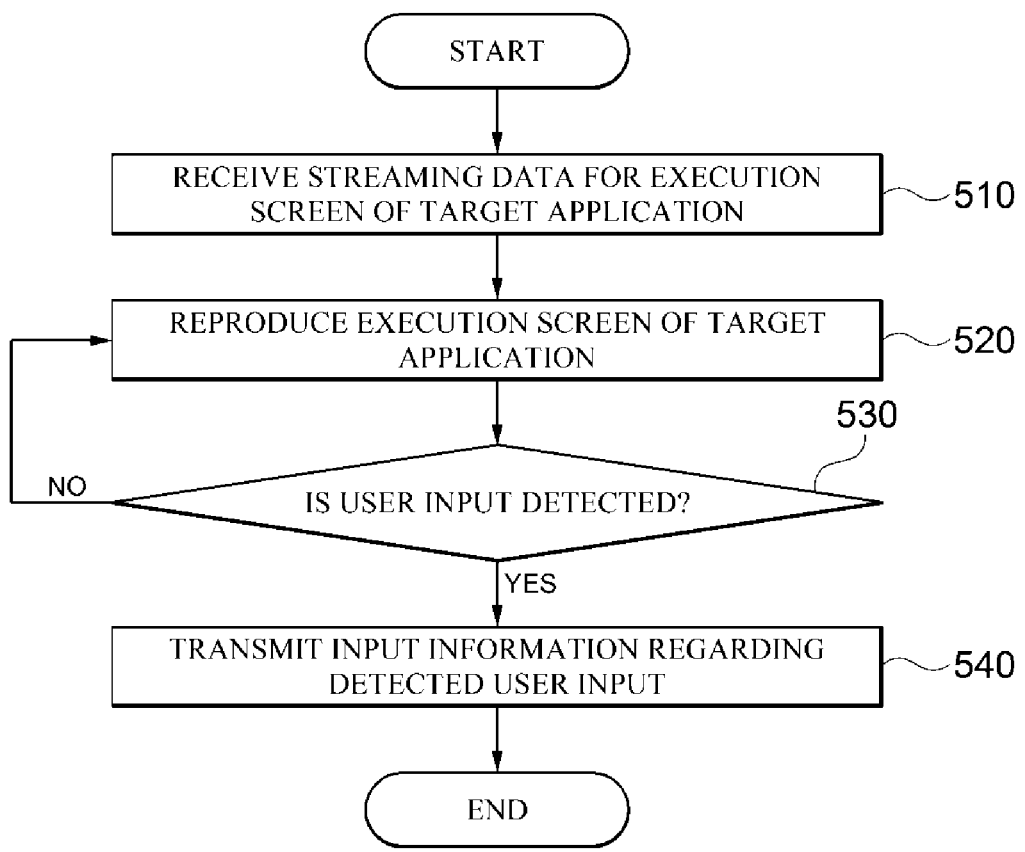
FIG. 5 is a flowchart executed by a second user terminal to control streaming play for a target application according to one embodiment.

FIG. 5 is a flowchart executed by a second user terminal 120 to control streaming play for a target application according to one embodiment.

The process illustrated in FIG. 5 may be performed by a streaming play application installed in the second user terminal 120, but is not necessarily limited thereto.

Referring to FIG. 5, the second user terminal 120 receives streaming data for an execution screen of the target application among one or more game applications installed in a first user terminal 110 (510).

In this case, according to one embodiment, a transmission quality of the streaming data may be determined according to control information transmitted to the first user terminal 110 from the second user terminal 120.

Then, the second user terminal 120 reproduces the execution screen of the target application using the received streaming data (520).

Then, the second user terminal 120 detects a user input for the reproduced execution screen (530) and then transmits input information regarding the detected user input to the first user terminal 110 (540).

Here, the input information may include, for example, a type of user input (e.g., touch, drag, click, double-click, gesture type, and the like), a position of the user input, and the like.

In the flowchart illustrated in FIG. 5, the process is illustrated as being divided into a plurality of operations. However, it should be noted that at least some of the operations may be performed in different order or may be combined into fewer operations or further divided into more operations. In addition, some of the operations may be omitted, or one or more extra operations, which are not illustrated, may be added to the flowchart and be performed.

Figure 6:
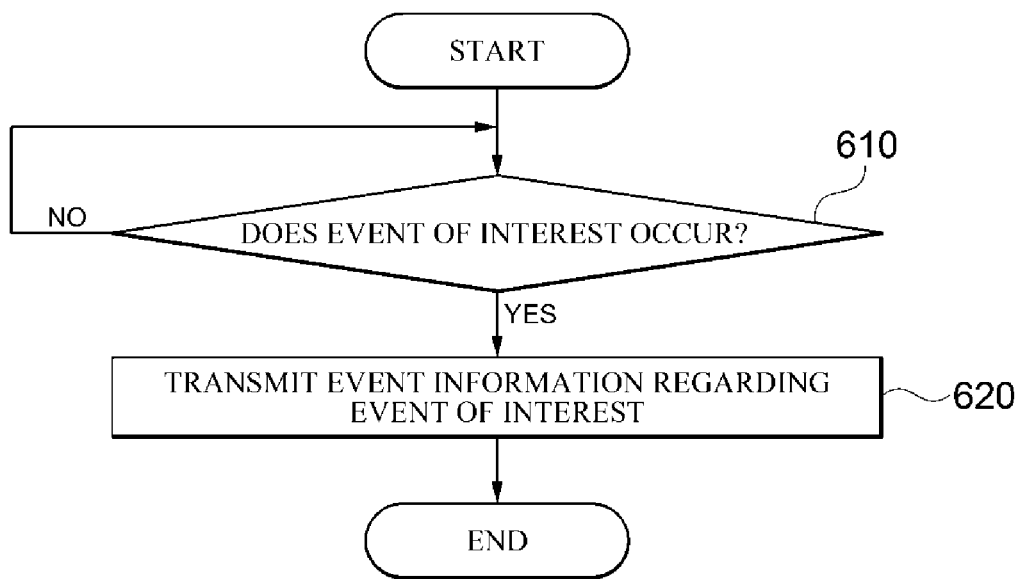
FIG. 6 is a flowchart illustrating a process of transmitting event information regarding an event of interest according to one embodiment.

FIG. 6 is a flowchart illustrating a process of transmitting event information regarding an event of interest according to one embodiment.

The process illustrated in FIG. 6 may be performed by a launcher application installed in a first user terminal 110, but is not necessarily limited thereto.

Referring to FIG. 6, the first user terminal 110 determines whether an event of interest occurs in a target application to be controlled (610).

Here, the event of interest may include events that may be of interest to a user or require user's interaction among events that may occur during execution of the target application, for example, acquisition of an item, a change in hit point (HP) of a game character, death of a game character, and the like. The event of interest may be set or changed by, for example, the user.

According to one embodiment, the first user terminal 110 may determine whether the event of interest occurs through an image analysis of an execution screen of the target application. For example, the first user terminal 110 may recognize a text or a changed message at a time when it is determined that there is a significant change in a game play situation, such as when an image is changed within the execution screen of the target application and a text in a chat window is changed or a numeric value, such as HP score in a game, which serves as an indicator of a game, is changed. Also, the first user terminal 110 identifies which event of interest has occurred according to the recognition result. For instance, when a message indicating that HP of a game character drops to a predetermined threshold value, the first user terminal 110 may determine that an event of interest that notifies that the HP is below or equal to the threshold value has occurred.

When the event of interest has occurred, the first user terminal 110 may transmit event information including at least one of event occurrence information of the occurring event of interest and a video related to the event of interest to at least one of a second user terminal 120 and an event sharing server 140 (620).

In this case, according to one embodiment, the event occurrence information of the event of interest may include, for example, content of the event of interest, occurrence time, an image corresponding to the event of interest, and the like.

Also, according to one embodiment, the video related to the event of interest may be a video that records an execution screen of the target application for a predetermined time (e.g., 5 seconds) before and after the event of interest occurs.

In the flowchart illustrated in FIG. 6, the process is illustrated as being divided into a plurality of operations. However, it should be noted that at least some of the operations may be performed in different order or may be combined into fewer operations or further divided into more operations. In addition, some of the operations may be omitted, or one or more extra operations, which are not illustrated, may be added to the flowchart and be performed.

Figure 7:
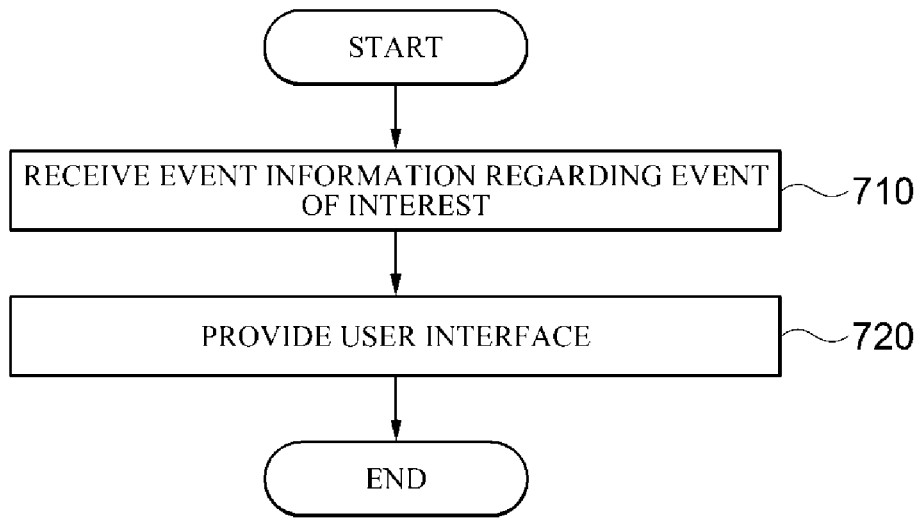
FIG. 7 is a flowchart illustrating a process of providing event information regarding an event of interest according to one embodiment.

FIG. 7 is a flowchart illustrating a process of providing event information regarding an event of interest according to one embodiment.

The process illustrated in FIG. 7 may be performed by, for example, a streaming play application installed in a second user terminal 120, but is not necessarily limited thereto.

Referring to FIG. 7, the second user terminal 120 receives event information regarding an event of interest that occurs in a target application to be controlled from a first user terminal 110 (710).

Here, the event information may include at least one of, for example, event occurrence information of the event of interest and a video related to the event of interest.

Then, the second user terminal 120 provides a user interface that allows a user to check the received event information to the user through a display screen of the second user terminal 120 (720).

In the flowchart illustrated in FIG. 7, the process is illustrated as being divided into a plurality of operations. However, it should be noted that at least some of the operations may be performed in different order or may be combined into fewer operations or further divided into more operations. In addition, some of the operations may be omitted, or one or more extra operations, which are not illustrated, may be added to the flowchart and be performed.

FIGS. 8A to 8D are diagrams for describing an example in which streaming play for a target application is controlled according to one embodiment.

Figure 8A:
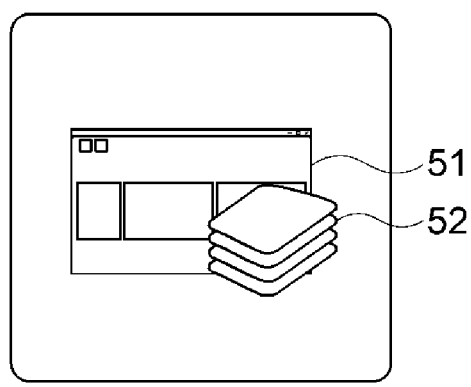
FIGS. 8A to 8D are diagrams for describing an example in which streaming play for a target application is controlled according to one embodiment.

Referring to FIG. 8A, an online game, which is a target application to be controlled, is being executed in a first user terminal 51. In this case, where the target application to be controlled is a mobile game and the first user terminal 51 is not a mobile device, the first user terminal 51 may execute the target application using a predetermined method, such as a app player 52.

In the meantime, the online game, which is the target application, may be automatically played in the first user terminal 51 using a feature such as automatic hunting. Here, the "automatic hunting" refers to a function in which operations for game progression, such as monster hunting, acquisition of an item, and the like, are performed without a user's interaction.

Figure 8B:
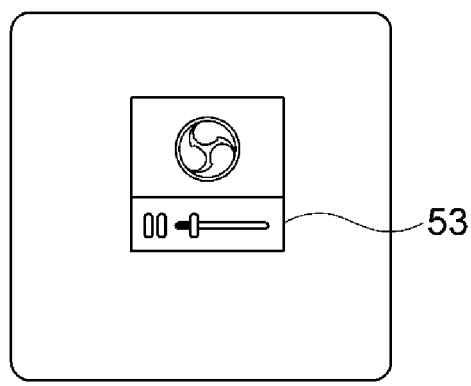
Figure 8C:
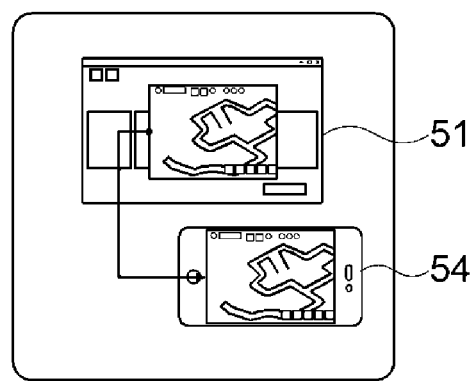

Referring to FIGS. 8B and 8C, an execution screen of the target application that is running in the first user terminal 51 is streamed and reproduced on a second user terminal 54. In this case, transmission of streaming data for the execution screen and a streaming transmission quality may be controlled by a launcher application 53 executed in the first user terminal 51 according to control information transmitted from the second user terminal 54.

Figure 8D:
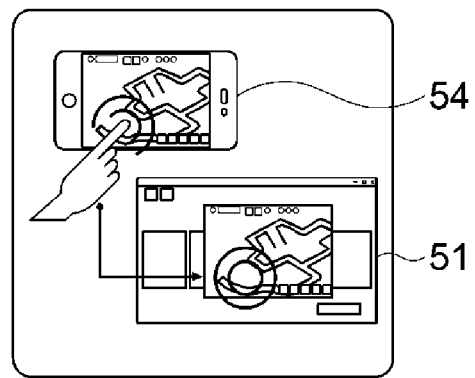

Referring to FIG. 8D, when a user input for the reproduced execution screen is detected, for example, when the user touches a predetermined position on the execution screen reproduced on the second user terminal 54, the second user terminal 54 may transmit input information on the detected user input to the launcher application 53 of the first user terminal 51. In this case, the launcher application 53 may deliver the received input information to the target application to control an operation corresponding to the input information to be executed.

Figure 9:
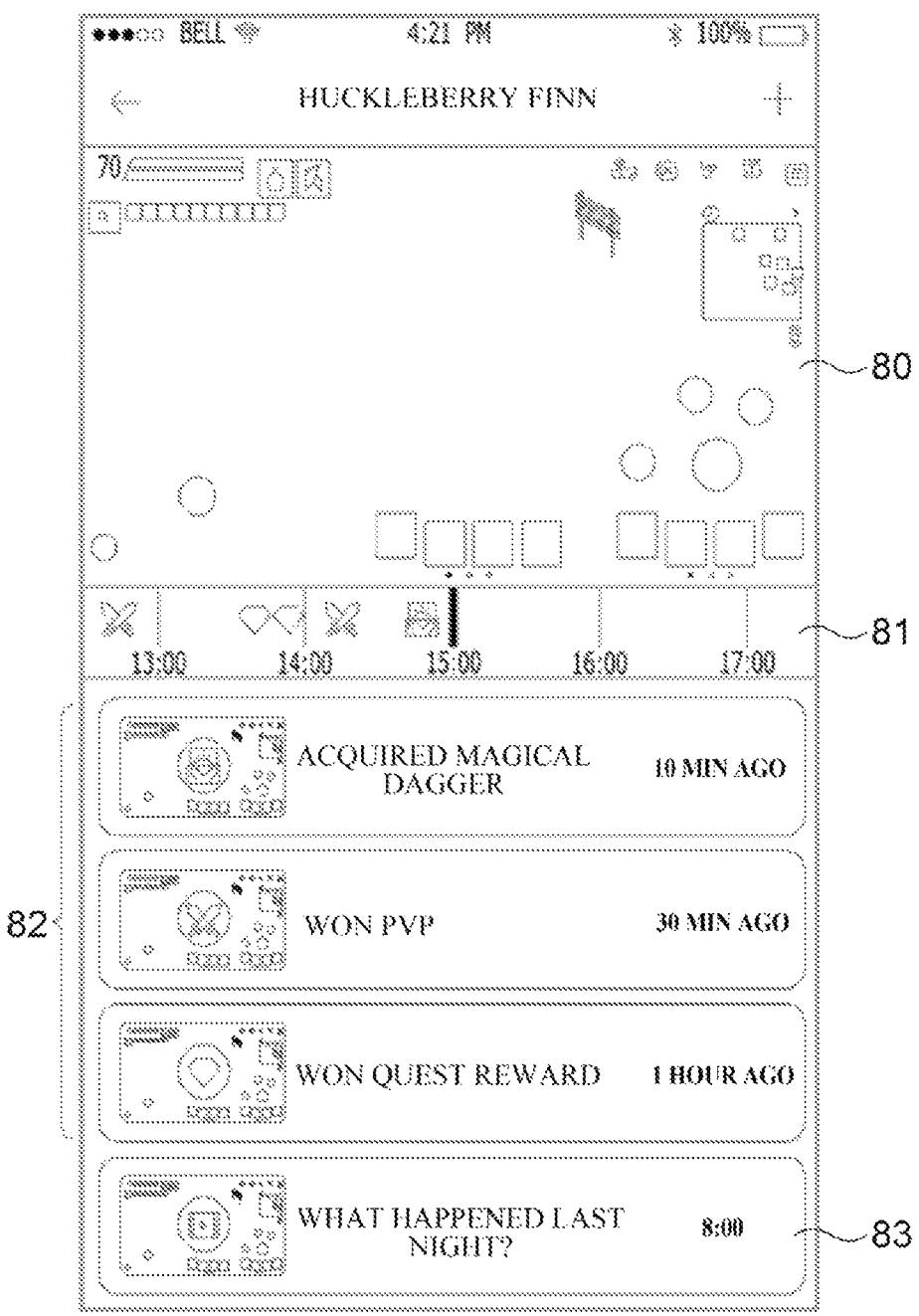
FIG. 9 is a diagram illustrating an example of a user interface screen provided by a second user terminal for checking event information.

FIG. 9 is a diagram illustrating an example of a user interface screen provided by a second user terminal for checking event information.

Referring to FIG. 9, a user interface screen may display a list 82 of event information received from a first user terminal. Each item included in the list 82 of the event information may correspond to event information regarding a different event of interest and may include content of an event of interest, occurrence time, an image corresponding to an event of interest, and the like. Meanwhile, where the user selects a specific item 83 from the list 82 displayed on the user interface screen, the second user terminal may reproduce detailed information on an event of interest corresponding to the selected item 83 or a video related to the event of interest on a video reproduction region 80 in the user interface screen.

Also, the user interface screen may provide a timeline-based interface 81 that shows occurrence times of events of interest that occur in the first user terminal. Specifically, icons representing each event of interest are arranged according to the order of occurrence in the timeline-based interface 81, whereby the user can check a desired event of interest through timeline search. In addition, where the user selects an event of interest from the timeline, the second user terminal may reproduce a video related to the selected event of interest on the video reproduction region 80.

Figure 10:
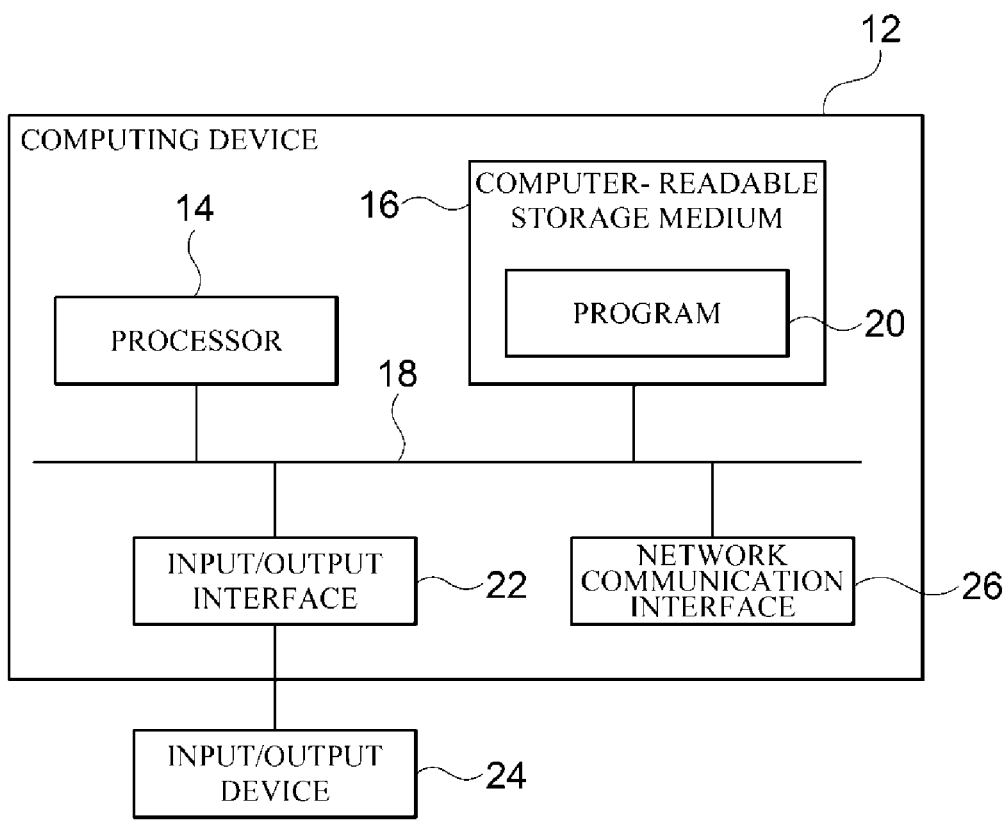
FIG. 10 is a block diagram for describing a computing environment including a computing device suitable to be used in exemplary embodiments.

FIG. 10 is a block diagram for describing a computing environment including a computing device suitable to be used in exemplary embodiments.

In the embodiment illustrated in FIG. 10, each of the components may have functions and capabilities different from those described hereinafter and additional components may be included in addition to the components described herein.

The illustrated computing environment 10 includes a computing device 12. In one embodiment, the computing device 12 may be one or more components included in the first user terminal 110 or the second user terminal 120 illustrated in FIG. 1.

The computing device 12 includes at least one processor 14, a computer readable storage medium 16, and a communication bus 18. The processor 14 may cause the computing device 12 to operate according to the above-described exemplary embodiments. For example, the processor 14 may execute one or more programs stored in the computer-readable storage medium 16. The one or more programs may include one or more computer executable commands, and the computer executable commands may be configured to, when executed by the processor 14, cause the computing device 12 to perform operations according to the illustrative embodiment.

The computer readable storage medium 16 is configured to store computer executable commands and program codes, program data and/or information in other suitable forms. The programs stored in the computer readable storage medium 16 may include a set of commands executable by the processor 14. In one embodiment, the computer readable storage medium 16 may be a memory (volatile memory, such as random access memory (RAM), non-volatile memory, or a combination thereof) one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24 which is one component constituting the computing device 12 may be included inside the computing device 12 or may be configured as a separate device from the computing device 12 and connected to the computing device 12.

According to one embodiment of the present disclosure, an application installed in a first user terminal is allowed to be controlled using a second user terminal, so that spatial and temporal constraints for using the application can be resolved, thereby improving accessibility of the user to the application.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for controlling an application, the method comprising:
   receiving, by a second user terminal from a first user terminal, state information of one or more applications installed in the first user terminal;
   displaying, by the second user terminal, a selection screen to receive a user's selection of a target application to be controlled from among the one or more applications; and
   transmitting, by the second user terminal to the first user terminal, control information for controlling a state of the target application selected by a user from among the one or more applications through the selection screen to the first user terminal based on the state information,
   wherein the method further comprises:
   receiving, from the first user terminal by the second user terminal via a launcher application installed in the first user terminal, event information of an event of interest that occurs during execution of the target application, the launcher application being configured to determine that the event of interest occurs through an image analysis of an execution screen of the target application; and
   providing, by the second user terminal, a user interface which allows the user to check the event information.

2. The method of claim 1, wherein the transmitting to the first user terminal comprises transmitting control information for controlling at least one of an execution state of the selected target application and transmission of the execution screen of the selected target application to the first user terminal.

3. The method of claim 1, wherein the state information includes information regarding an execution state of each of the one or more applications, and
   wherein the control information includes at least one of information for controlling the target application to be executed in the first user terminal, information for enabling an execution state of the target application to be switched to a foreground execution state in the first user terminal, and information for enabling at least one of a size, position, display mode, and arrangement order of the execution screen of the target application to be changed in the first user terminal.

4. The method of claim 1, wherein the control information includes information for controlling a streaming transmission quality for the execution screen of the target application.

5. The method of claim 1, further comprising:
   receiving streaming data for the execution screen of the target application from the first user terminal;
   reproducing the execution screen of the target application using the streaming data; and
   in response to a user input for the reproduced execution screen being detected, providing input information regarding the user input to the first user terminal.

6. The method of claim 1,
   wherein the event information includes at least one of event occurrence information of the event of interest that occurs during the execution of the target application and a video related to the event of interest.

7. A method for controlling an application, the method comprising:
   providing state information of one or more applications installed in a first user terminal to a second user terminal;
   receiving control information for controlling a state of a target application among the one or more applications from the second user terminal; and
   controlling the state of the target application based on the control information,
   wherein the control information includes at least one of information for switching the target application, which is currently being executed but is not in a foreground execution state, to the foreground execution state in the first user terminal or information for changing at least one of a size, a position, a display mode, or an arrangement order of an execution screen of the target application, which is currently being executed, in the first user terminal.

8. The method of claim 7, wherein the receiving of the control information comprises receiving control information for controlling at least one of an execution state of the target application and transmission of the execution screen of the target application, and
   wherein the controlling of the state of the target application comprises controlling at least one of the execution state of the target application and the transmission of the execution screen of the target application based on the control information.

9. The method of claim 7, wherein the state information includes information regarding an execution state of each of the one or more applications, and
   wherein the control information further includes information for controlling the target application to be executed in the first user terminal.

10. The method of claim 7, wherein the control information includes information for controlling a streaming transmission quality for the execution screen of the target application.

11. The method of claim 7, further comprising:
    transmitting streaming data for the execution screen of the target application to the second user terminal;
    receiving, from the second user terminal, input information regarding the execution screen of the target application reproduced on the second user terminal using the transmitted streaming data; and
    controlling an operation corresponding to the input information to be executed in the target application.

12. The method of claim 7, further comprising:
    determining whether an event of interest occurs in the target application; and
    in response to the event of interest occurring, transmitting event information which includes at least one of event occurrence information of the event of interest and a video related to the event of interest to at least one of the second user terminal and an event sharing server.

13. An apparatus comprising:
    a communication interface; and
    at least one processor,
    wherein the at least one processor is configured to:
    provide state information of one or more applications installed in a first user terminal to a second user terminal through the communication interface,
    receive control information for controlling a state of a target application among the one or more applications from the second user terminal through the communication interface, and
    control the state of the target application based on the control information,
    wherein the control information includes at least one of information for switching the target application, which is currently being executed but is not in a foreground execution state, to the foreground execution state in the first user terminal or information for changing at least one of a size, a position, a display mode, or an arrangement order of an execution screen of the target application, which is currently being executed, in the first user terminal.

14. The apparatus of claim 13, wherein the at least one processor is further configured to:
    receive control information for controlling at least one of an execution state of the target application and transmission of the execution screen of the target application, and
    control the at least one of the execution state of the target application and the transmission of the execution screen of the target application based on the control information.

15. The apparatus of claim 13, wherein the state information includes information regarding an execution state of each of the one or more applications, and
    wherein the control information further includes information for controlling the target application to be executed in the first user terminal.

16. The apparatus of claim 13, wherein the control information further includes information for controlling a streaming transmission quality for the execution screen of the target application.

17. The apparatus of claim 13, wherein the at least one processor is further configured to:

transmit streaming data for the execution screen of the target application to the second user terminal through the communication interface, receive input information regarding the execution screen of the target application reproduced on the second user terminal using the transmitted streaming data from the second user terminal through the communication interface, and control an operation corresponding to the input information to be executed in the target application.

18. The apparatus of claim 13, wherein the at least one processor is further configured to:

determine whether an event of interest occurs in the target application, and in response to the event of interest occurring, transmit event information which includes at least one of event occurrence information of the event of interest and a video related to the event of interest to at least one of the second user terminal and an event sharing server.

19. The method of claim 1, wherein the event information comprises at least one of content of the event of interest, occurrence time, or an image corresponding to the event of interest.

20. The method of claim 1, wherein the user interface may provide a timeline-based interface that shows occurrence times of events of interest that occur during the execution of the target application.

* * * * *